United States Patent
Kominar et al.

(10) Patent No.: US 10,708,052 B2
(45) Date of Patent: Jul. 7, 2020

(54) INADVERTENT PASSWORD ENTRY DETECTION

(71) Applicant: BlackBerry Limited, Waterloo (CA)

(72) Inventors: Jeremy Lawson Kominar, Waterloo (CA); Neil Patrick Adams, Waterloo (CA); Nick Mark Waterman, Waterloo (CA); Marc Anthony Lepage, Kanata (CA)

(73) Assignee: BlackBerry Limited, Waterloo, Ontario (CA)

(*) Notice: Subject to any disclaimer, the term of this patent is extended or adjusted under 35 U.S.C. 154(b) by 200 days.

(21) Appl. No.: 15/445,590

(22) Filed: Feb. 28, 2017

(65) Prior Publication Data

US 2018/0248698 A1 Aug. 30, 2018

(51) Int. Cl.
*G06F 21/00* (2013.01)
*H04L 29/06* (2006.01)
*G06F 21/31* (2013.01)
*G06F 21/45* (2013.01)
*H04L 9/32* (2006.01)

(52) U.S. Cl.
CPC ............ *H04L 9/3213* (2013.01); *G06F 21/31* (2013.01); *G06F 21/45* (2013.01); *H04L 9/3226* (2013.01); *H04L 9/3236* (2013.01)

(58) Field of Classification Search
CPC ... H04L 9/3213; H04L 9/3236; H04L 9/3226; G06F 21/31; G06F 21/45
See application file for complete search history.

(56) References Cited

U.S. PATENT DOCUMENTS

| 8,448,260 B1* | 5/2013 | Hansen | G06F 21/62 726/27 |
| 2010/0299727 A1* | 11/2010 | More | G06F 21/554 726/5 |
| 2012/0304302 A1 | 11/2012 | Stecher | |
| 2014/0137220 A1* | 5/2014 | Niemela | H04L 63/083 726/6 |
| 2014/0150108 A1* | 5/2014 | Low | G06F 21/60 726/26 |

FOREIGN PATENT DOCUMENTS

EP 3367278 A1 * 8/2018 ............ G06F 21/31

OTHER PUBLICATIONS

Elizabeth Stobert, Robert Biddle; "A Password Manager that Doesn't Remember Passwords"; NSPW '14: Proceedings of the 2014 New Security Paradigms Workshop; Sep. 2014; pp. 39-52 (Year: 2014).*

(Continued)

*Primary Examiner* — Kendall Dolly
*Assistant Examiner* — Courtney D Fields
(74) *Attorney, Agent, or Firm* — Jeffrey N. Giunta; Fleit Intellectual Property Law

(57) ABSTRACT

Systems and methods for monitoring data input are disclosed. A dataset entered into a non-password field is received. Based on the dataset meeting one or more criteria for a likely password, a determination as to whether the dataset is inadvertently entered into the non-password field is made. Based on determining that the dataset is inadvertently entered into the non-password field, further processing of the dataset is inhibited.

17 Claims, 8 Drawing Sheets

(56) References Cited

OTHER PUBLICATIONS

Blustein et al., "Bloom Filters-A Tutorial, Analysis, and Survey", CS-2002-10, Dec. 10, 2002, Faculty of Computer Science, Dalhousie University, pp. 1-31.
Deng, F., et al., "Approximately Detecting Duplicates for Streaming Data Using Stable Bloom Filters", Proceedings of the Association for Computing Machinery Special Interest Group on Management of Data, Jun. 26-29, 2006, pp. 1-12.
Extended European Search Report including the Search Report and Search Opinion for European Patent Application No. 18154429.7 dated Apr. 30, 2018.

* cited by examiner

INADVERTENT PASSWORD ENTRY DETECTION

FIELD OF THE DISCLOSURE

The present disclosure generally relates to monitoring user interfaces, and more particularly to detecting a possible inadvertent entry of a password.

BACKGROUND

Access to various data or functions via electronic devices is able to be limited by having a user enter a password or other credentials prior to granting access. Such passwords are often entered via user interfaces that have more than one input field. For example, a user interface that has one field for entering a password often has one or more other nearby text entry fields such as an input field for entering an account identifier (ID) or other information associated with the data or function being accessed. For various reasons, it is possible for a user to inadvertently enter password data into a text entry field other than a password entry field. Such other text entry fields may not provide the same security as is expected for text or other data entered into a password entry field.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
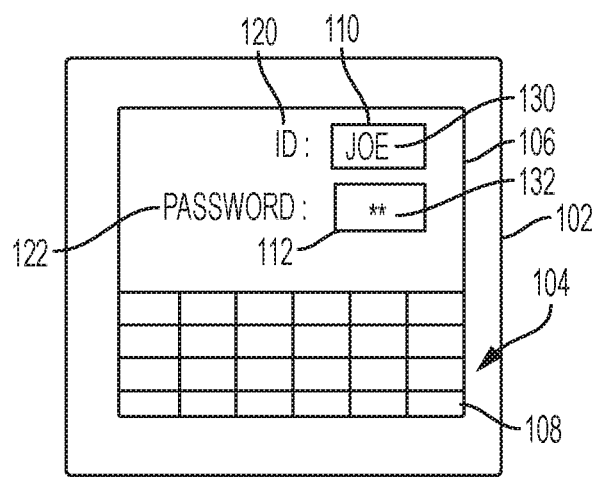
FIG. 1 illustrates an electronic device user interface view, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to detect and protect against possible inadvertent entry of a password into a text or data entry field that is not a password entry field. In some examples, user interfaces present password entry fields that provide more protection for the data entered into those fields than do other text or data entry fields. For example data entered into some text entry fields may be logged into file that is not encrypted and may have access that is not tightly restricted. For example, when a user fails to successfully login, that failed login attempt may be logged into a log file with the user's ID in plain text. In a case where a user inadvertently entered the password into the user ID text entry field, that inadvertently entered password is stored in the log file in plain text thus potentially allowing others to see that password. In another example, a user is able to inadvertently enter a password into a user ID text entry field or other text entry field. In such an example, the password that was inadvertently entered into a non-password entry field may be sent to a web service or other destination via a channel that is not property secure to handle passwords. Further, or alternatively, the web service or destination receiving the password that was entered into a non-password field may not provide sufficient security for the text that was entered into a non-password entry field and thus leave the password vulnerable.

The below described systems and methods operate by monitoring text or other data entered into text or data input fields on an electronic device. In an example, all text or data entry into a non-password entry field presented on user interfaces of the electronic device is monitored to determine if that entered text or data is likely to be a password. The below described systems and methods are able to use any technique to determine whether entered text or data is likely to be a password.

When text or data entered into a non-password entry field is determine to likely be a password, one or more various actions are able to be performed. In some examples, the user may simply be warned that a likely password has been entered into a non-password entry field. In another example, the systems and methods may operate to remove text or data from a non-password entry field when that entered text or data is determined to be a likely password. In yet other examples, the systems and methods may operate to obscure the text or data that has been entered into a non-password entry field when that entered text or data is determined to be a likely password. In other examples, two or more of these actions are able to be performed. A particular action to perform upon determining that a user has entered a likely password into a non-password entry field is able to be determined by any technique, such as is specified by device configurations, enterprise security policies, other techniques, or combinations of these.

One technique for determining if text or data is a likely password is to compare text entries to specified password complexity requirements. For example, passwords may be specified to have at least a minimum number of characters, have at least one numeric digit, and have at least one capital letter. Words with such characteristics tend to rarely be intentionally entered by users into non-password entry fields. When a user in one example enters a word that satisfies these password complexity rules into a non-password entry field, it is determined to be a likely password that was inadvertently entered.

An alternative technique for determining if text or data is a likely password includes a password manager program that monitors when passwords are copied from the password manager into a clipboard and determines if the password contained in the clipboard is pasted into a non-password entry field. Password managers include various programs that securely store passwords and allow a user to access those passwords for various programs. In some examples, a user copies the password into the clipboard of a computer's operating system and then generally pastes that password into an intended password entry field. The password manager in an example allows the password that was copied into the clipboard to be pasted into password entries fields without interference, but a user's pasting such a password from the clipboard into a non-password entry field is determined to be a likely password that was inadvertently entered by being passed from the clipboard. In some examples, a device with two or more partitions, such as a "work" partition and a "personal" partition allow copying data into the clipboard from one partition and pasting that data into entry fields of another partition. In such an example, the password manager monitors such copying and pasting that is performed across partitions. Partitions may also be referred to as workspaces, containers, and the like.

Another technique for determining if text or data is a likely password includes monitoring text entered into password entry fields and then determining and storing one or more hash values for that entered text. In various examples, text or data is able to be entered into a password entry field by any suitable technique, such as one or more of via a keyboard, via pasting from a keyboard, via any suitable source, or combinations of these. When text or data is entered into a non-password entry field from any suitable source, such as one or more of a keyboard, a clipboard, other sources, or combinations of these, a similar one or more hash values is determined for that text or data and compared to stored hash values of text entered into password entry fields. When a user in one example enters into a non-password entry field a word whose one or more hash values matches a stored hash value, that entered word is determined to be a likely password that was inadvertently entered. In an example, the password manager monitors when data is pasted from the clipboard after any password is pasted from the password manager into the clipboard until the contents of the clipboard, i.e., that copied password, is cleared by any technique. In an example, the clipboard is cleared when a user copies new data into the clipboard. In an example, the password monitor is able to monitor when a password has been copied into the clipboard and then operates to automatically clear the clipboard after that password has been pasted into any field. In various examples, the password is cleared from the clipboard when the password is pasted into a non-password field or when the password is entered into any field.

In yet another example, text or other datasets entered into password entry fields are tracked by use of a Bloom filter. Bloom filters operate by maintaining a data vector where each bit in the vector is able to be individually addressed. A Bloom filter is initialized by setting all of the bits in this vector to "0." The operation of the Bloom filter "adds" indication of a particular first dataset, such as text entered into a password entry field, into the data structure maintained by the Bloom filter by setting bits in Bloom filter vector that corresponds to parts of one or more hash values for that first dataset. In an example, when a second dataset, such as text or data entered into a non-password entry field, is received, a Bloom filter determines the same one or more hash values for that second dataset and determines if the corresponding bits for those one more hash values are set in the Bloom filter vector. If one or more of those bits is are not set, the second dataset has not been "added" to the Bloom filter. If all of those bits are set, then it is likely that the second dataset had been added to the Bloom filter. Because text entered into password entry fields are added to the Bloom filter in an example of the below described systems and methods, the second dataset in this example is likely to be a password. If the second dataset was entered into a non-password entry field, it is determined that its entry was inadvertent in an example.

To illustrate an example of the operation of a Bloom filter, assume that a hash value for a dataset is determined to be 12,345,678 (decimal). In this example, that value itself is not stored as part of Bloom filter processing. In an illustrative example, assume that a Bloom filter vector has 1,000 bits, which are numbered from 0-999. In such an example, each bit in the Bloom filter vector is able to represent three decimal digits. In the stated example of a hash value of 12,345,678, in one example a Bloom filter's processing stores indications of this value by setting the values of three bits in the Bloom filter vector to one ("1"), i.e., bit 012, bit 345, and bit 678 in this example are set to one. In another example, this set of three (3) groups of three (3) digits may be determined by calculating three different hash values that are each three digits long. In general, it is understood that effective Bloom filters are able to be designed using any data identification techniques. In various examples, hash values, salts, other reduced representations of datasets, or combinations of these are able to be used.

In the example of a hash value of 12,345,678, adding this hash value to the Bloom filter vector of 1000-bits that has not had any bits set yet yields the following:

```
0000000000001000000000000000000000000000000000000000    <- bit 012
0000000000000000000000000000000000000000000000000000
0000000000000000000000000000000000000000000000000000
0000000000000000000000000000000000000000000000000000
0000000000000000000000000000000000000000000000000000
0000000000000000000000000000000000000000000000000000
0000000000000000000000000000000000000000000000010000    <- bit 345
0000000000000000000000000000000000000000000000000000
0000000000000000000000000000000000000000000000000000
0000000000000000000000000000000000000000000000000000
0000000000000000000000000000000000000000000000000000
0000000000000000000000000000000000000000000000000000
0000000000000000000000000000000000000000000000000000
0000000000000000000000000001000000000000000000000000    <- bit 678
0000000000000000000000000000000000000000000000000000
0000000000000000000000000000000000000000000000000000
0000000000000000000000000000000000000000000000000000
```

-continued 000000000000000000000000000000000000000000000000000
000000000000000000000000000000000000000000000000000
000000000000000000000000000000000000000000000000000

In order to determine if the Bloom filter indicates that a particular new dataset had been added to the Bloom filter vector, the hash value is determined for that new dataset and that hash value is divided into the three sets of three digits as described above. If any of the bits corresponding to any of the three sets of three digits is zero (0), then it is a certainty that the new dataset had not been added to the Bloom filter vector. If all of the bits corresponding to all three of the three digits are one "1," then it is likely, but not certain, that the new dataset had been added to the Bloom filter vector.

Bloom filters are able to be implemented by using a variety of similar techniques. For example, as an alternative to the above example of initializing a Bloom filter vector with all zeros (0) and setting bits to one (1), another implementation is to initialize a Bloom filter vector with all ones (1) and setting bits to zero (0). Further, data structures similar to the above described Bloom filter vector are able to be implemented with elements other than just bits, such as integer values, real number values, other values, or any combination of these.

The mathematics and probabilities of false positives for Bloom filter operations as a function of Bloom filter vector size, hash value lengths, number of entries into the Bloom filter vector, and other design considerations are well understood. For example, operations and design consideration of Bloom filters is described in Blustein, James; El-Maazawi, Amal (2002) "Bloom Filters—A Tutorial, Analysis, and Survey," the entire contents and teachings of which are included herein by reference. In some examples, a Stable Bloom filter is able to be effectively used. Examples of operations and design of Stable Bloom filters are described in Deng, Fan; Rafiei, Davood (2006) "Approximately Detecting Duplicates for Streaming Data using Stable Bloom Filters," the entire contents and teachings of which are included herein by reference.

In an example, when a user enters any data, such as text, into a password entry field, that entered data is process and added to a Bloom filter vector. When data, such as text, is entered into any non-password entry field, that new data is processed and a determination is made if the Bloom filter vector indicates that it is likely that the new data had been added to the Bloom filter vector.

In the present discussion, examples are described using the term password and generally presumes that a password is textual data that is entered via a user interface. In general, the below systems and methods are applicable to any type of credential that uses any type of dataset to control access to functions, operations, other aspects of a device, or combinations of these. A password entry field in general is able to be any data entry facility that may or may not be part of a user interface. The following discussion uses examples of a hash value as a value that is determined based on values or contents of a dataset that can be used to uniquely identify that dataset with a particular amount of certainty. Although hash values are used in the below described examples, it is to be understood that any technique to determine a value used to identify a particular dataset is able to be used, where such techniques may have various degrees of certainty in uniquely identifying the dataset. Further, values or other data used to identify a dataset is able to have any length where the lengths of such values are able to be fixed or variable.

The below examples describe a simple user interface that includes one non-password entry field, such as a User ID entry field, and a password entry field. In general, the below described systems and methods are able to be applied to any scenario where credentials are entered. Some examples of applications for the below described systems and methods include, but are not limited to, logging into computer operating systems, logging into applications or functions accessed via an Internet Web Browser, any entry of sensitive information that is to be protected from inadvertent disclosure, or combinations of these.

In general, the systems and methods described below are applicable to any type of device. In various examples, these systems and methods are applicable to any type of electronic device that is able to be used in any type of operational environment. In some examples, these systems and methods are able to be included in desktop systems, physically installed systems, other systems that are not intended to be frequently moved, or in combinations of these. In further examples, these systems and methods can be incorporated into one or more of portable electronic devices, which include devices that are easily carried by a person or other carrier; or mobile devices including smartphones, tablets, phablets, wearable devices, and include devices mounted in movable systems such as vehicles of any type. In various examples, these electronic devices are able to be located in vehicles that include, but are not limited to, motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. These electronic devices are also able to include fixed devices, which include devices that are not designed to be easily or often relocated such as desktop electronic equipment; other types of electronic equipment, or combinations of these. Other examples of devices include an endpoint device, IoT (Internet of Things) device, EoT (Enterprise of Things) device, etc.

FIG. 1 illustrates an electronic device user interface view 100, according to an example. The electronic device user interface view 100 depicts an example electronic device 102 that monitors for possible inadvertent entries of passwords into non-password fields. The illustrated electronic device is an example used to describe relevant aspects of the below described systems and methods. In various examples, similar electronic devices are able to be any suitable type of electronic device. In general, any electronic device that accepts passwords or other credentials is able to include aspects of the below described systems and methods, whether such devices have any type of display, any type of user inputs, any type of data inputs, or combinations of these.

The electronic device user interface view 100 may include a display 104. The display 104 in this example comprises a touch sensitive display that supports the display and operation of a virtual touchscreen keyboard 108. The touch sensitive display 104 is able to receive various user inputs. A user is able to touch, swipe, perform various gestures various, and utilize other techniques recognized by the touch sensitive display 104 to provide various inputs. In one example, the virtual touchscreen keyboard 108 allows a user to enter alphanumeric data, such as passwords, into processing performed by the electronic device. In further examples, other user input facilities are able to be included in, in communications with, or otherwise interfacing with, the electronic device 102 to allow a user to provide alphanumeric input.

The touch sensitive display 104 further includes a user input field display 106. The user input field display 106 includes two input fields, an ID field 110 and a password field 112. The ID field 110 has a first label "ID:" 120 and the password field 112 has a second label "PASSWORD:" 122. The user input field display 106 is similar to a conventional "login screen" presented by many operating systems or some programs that protect access to certain functions. A user is able to select the ID field 110, such as by touching the screen over that field or by other techniques, and use the virtual touchscreen keyboard 108 to enter text into that field.

In this example, the user has entered the text "JOE" 130 into the ID field 110. JOE in this example is a user identifier, such as a user name. The user has selected and entered text into the password field 112. The processing of the user input field display 106 does not print text entered into the password field 112 in order to protect the entered password. As illustrated, as a user enters text into the password field 112, asterisks "*" 132 are displayed.

Figure 2:
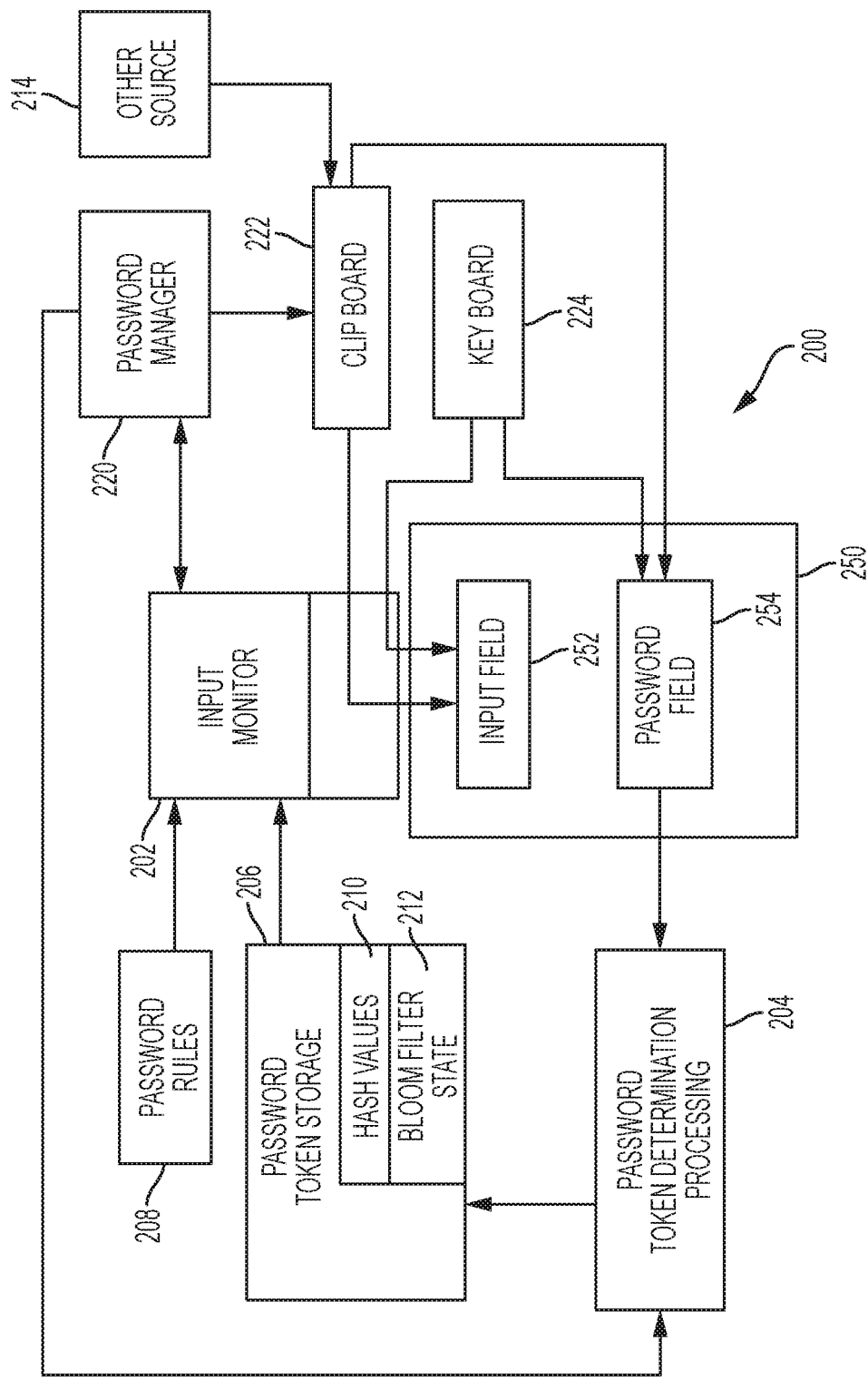
FIG. 2 illustrates an input field monitoring data flow, according to an example.

FIG. 2 illustrates an input field monitoring data flow 200, according to an example. The input field monitoring data flow 200 depicts an example of data flow and processing that is performed by the below described systems and methods. In an example, the input field monitoring data flow 200 is performed by one or more processors in the above described electronic device 102.

The input field monitoring data flow 200 includes a user interface 250 that includes an input field 252 and a password field 254. In an example, the input field 252 is an example of a non-password entry field and is able to be any field that is able to receive text input that is able to be provided to an active application associated with the displayed user interface 250. The above described ID field 110 is an example of an input field 252, although in various examples a user interface is able to have one or more input fields that are able to accept any length of text input. In general, a user interface is able to include any number of fields, including zero, that are similar to input field 252. These input fields are able to be in any location on the user interface 250, such as before, after, or both before and after, the password field 254.

In an example, an input field 252 is able to be associated with a target application. A target application generally refers to an application that receives data, such as text, that is entered into the input field 252. For example, a login application is able to present the user input field display 106, described above, and is thus the target application that will receive text entered into the ID field 110 and process it accordingly.

The password field 254 in an example of a password entry field and is similar to the password field 112 discussed above. In an example, such as is illustrated above in regards to the user input field display 106, the active application for the user interface 250 is able to be a login application for an operating system or an application that controls access to users with login credentials that include a user name and password.

The password field 254 in an example is a dedicated input field that allows a user to enter a password to gain access to restricted functions. Passwords are generally intended to remain secret and applications or computer operating system functions that receive password inputs provide special processing of received passwords to maintain their secrecy. For example, characters are entered into the password field 254, the entered characters are replaced by generic characters, such as asterisks "*" or other placeholders. An operating system or application may also perform special processing of text entered into a password field 254, such as ensuring the entered text is not logged or stored in a plaintext format. In some examples, an ability of other processes to monitor or intercept text data entered into a password field 254 is restricted.

In an example, the below described systems operate to monitor and process data inputs, such as text, that are provided into input fields, such as the input field 252 and password field 254. In some examples, text entered into the password field is monitored and processed to determine characterizations of the input. As is described in further detail below, some examples monitor and process data entered into password field 254 to identify tokens that are used to recognize future entries of the same data into other input fields, such as the input field 252. In some examples, as is further described below, data entered into input fields that are not designated as password fields, which are examples of non-password fields, is processed according to a variety of techniques to determine whether the data entered into the non-password field is likely to be an inadvertently entered password. As is described below, this determination is based upon an analysis of data entered into non-password fields based upon password rules, tokens derived from data previously entered into password fields, based upon other techniques, or based on any combination of these.

In some examples, a determination of whether an entry into a non-password input field is determined by comparing data input into the non-password input to tokens determined based upon data that was observed to have been entered into a password field. As shown in the input field monitoring data flow 200, a password token determination processing component 204 monitors data, such as text, that is input into a password field 254. In an example, entry of data into a password field 254 causes that data to be provided to the target application that is intended to receive the entered password, and the entered data is also provided to the password token determination processing component 204. The target application in an example processes the entered data conventionally.

The password token determination processing component 204 in an example operates to monitor the entry of entered passwords into the password field 254. The password token determination processing component 204 in an example determines one or more password tokens based on entered passwords or other datasets entered into the password field 254. In some examples, the password token determination processing component 204 calculates one or more hash values for the data entered into the password field 254. In another example, the password token determination processing component 204 determines values to maintain a Bloom filter vector to support determining if it is likely that another data pattern matches the data entered into the password field. In further examples, the password token determination processing component 204 is able to determine any token value that supports determining if a dataset, such as a text input entered into an input field 252, is likely to be a dataset that was entered into a password field 254.

The tokens determined by the password token determination processing component 204, which are one or more hash values, entry into a supporting a Bloom filter vector, other tokens, or combinations of these, are stored in a password token storage 206. The password token storage 206 includes one or more of hash value storage 210, Bloom filter state 212, other token data, or combinations of these.

In some examples, one or more processes operating within a device are able to be configured to monitor and receive user inputs that are entered into input field 252, such as an ID field 110 or other non-password input field. In such examples, the target application receives the entered data and the one or more processes configured to monitor input field 252 also receives that same data that was entered.

The illustrated input field monitoring data flow 200 includes an input monitor 202. The input monitor 202 in an example is a process that is configured to monitor data that is entered into input field 252. In an example, the input monitor 202 processes text that is input into any non-password input field. The input monitor 202 in an example analyzes the data that is input into a non-password input field, such as the input field 252, to determine if that data is the same as data entered into a password field 254. In further examples, the input monitor is able to monitor data entered into a non-password input field, such as the input field 252, to determine if that data is likely to be password that may or may not have been previously entered into a password field. This analysis is able to be based on one or more of several techniques as is described below.

The illustrated input monitor 202 monitors for data entry into the input field 252 that is entered from either a keyboard 224 or clipboard 222. In some examples the input monitor 202 is able to data entry into an input field 252 via facilities provided by an operating system under which the input monitor 202 operates. For example, the Android operating system provides an accessibility services framework that allows direct monitoring of, or input to, any input field. In various examples, elements corresponding to at least part of the input monitor 202 are able to be included in parts of browsers, components that operate with or receive input from a keyboard, any user interface framework provided by an operating system or other component of a device. In some examples, at least some aspects of the input monitor 202 are able to be included in any type of processing widget (e.g., a client side web page processing component), widget set, similar components, or combinations of these.

The keyboard 224 is able to comprise any type of keyboard that supports entry of password, passcodes, other data, or combinations of these. The above described virtual touch-screen keyboard 108 is an example of a keyboard 224. Any other keyboard whether physical, virtual, other type, or combinations of these are further examples of keyboard 224. In some such examples, the input monitor 202 analyzes the data entered into the input field 252 from the keyboard 224 to determine it is it is likely to be a password, or to be a dataset that was previously entered into a password field 254.

Clipboard 222 in an example allows data such as text to be cut or copied from a document or other source, such as other source 214, and stored into the clipboard 222. In various examples, data can be copied or cut into the clipboard 222 from any suitable sources, such as from e-mail, text editors, spreadsheets, other data structures, other sources, or combinations of these. Once data, such as text, is stored in the clipboard 222, that data can be pasted into a selected destination. In an example, the contents in a clipboard 222 is able to be pasted into an input field 252. In some such examples, the input monitor 202 analyzes the data that is to be pasted into the input field 252 from the clipboard 222 to determine it is it is likely to be a password, or to be a dataset that was previously entered into a password field 254. In an example, the input monitor 202 is able to analyze the data to be pasted before it is pasted into the input field 252. In other examples, analysis of the data to be pasted is able to be performed at any suitable time.

In some examples, a device with two or more partitions, such as a "work" partition and a "personal" partition allow copying data into the clipboard 222 from one partition and pasting that data into entry fields of another partition. In such an example, the input monitor 202 monitors such pasting that is performed across partitions. In some examples, the input monitor 202 is able to monitor inputs to the input field 252 for likely passwords that were observed in any partition on a device.

The input field monitoring data flow 200 includes a password rules definition 208. In an example, the password rules definition 208 includes specifications for character diversity within valid passwords. For example, a system may specify that valid passwords are required to have at least one capital letter, at least one lower case letter, at least one numeral, and be at least eight (8) characters long. In general, it is unlikely that a user intends to enter a natural language word into a document or other plaintext field that satisfies these rules. In an example, it is assumed that it is highly unlikely that a user is intentionally entering a word that satisfies the password rules definitions 208 and thus such an entry is an inadvertent password entry.

As an alternative to, or in addition to, comparing entered data to the password rules definition 208, the input monitor 202 is able to analyze data entered into an input field 252 based on tokens stored in the password token storage 206 to identify likely inadvertent password entries into non-password fields. In an example, the input monitor 202 determines at least one dataset token for each dataset, such as text, that is entered into the input field 252. In an example, the determined dataset tokens are able to include at least one hash value. The input monitor 202 in an example is able to compute hash values for each dataset entered into the input field 252 and compare the calculated hash values to the hash value storage 210. In an example, calculation of hash values for data entered into the input field 252 may be conditioned on a determination that the dataset satisfied the password rules definition 208.

As an alternative to, or in addition to, comparing entered data to the password rules definition 208, the input monitor 202 is able to analyze datasets entered into the non-password input field 252 through use of a Bloom filter state 212 maintained by the password token storage 206. In such an example, the input monitor 202 determines at least one dataset token that is able to include data bits sent in a Bloom filter vector that is maintained in the Bloom filter state 212. In an example, analyzing such datasets through the use of a Bloom filter vector that is maintained in the Bloom filter state 212 is able to be performed after a determination that the dataset satisfied the password rules definition 208.

In a further alternative, or additionally, the input monitor 202 is able to analyze data entered into an input field 252 based on tokens stored in the password token storage 206 to identify likely inadvertent password entries into non-password fields. In an example, the input monitor 202 is able to compute hash values for each dataset entered into the input field 252 and compare the calculated hash values to the stored hash values in the hash value storage 210. In an example, calculation of hash values for data entered into the input field 252 may be conditioned on one or both of a determination that the dataset satisfied the password rules definition 208, analysis via the Bloom Filter vector that is maintained in the Bloom filter state 212 indicates that the dataset may have been entered into a password field 254, or both.

In another further alternative, or additionally, a password manager 220 operates in conjunction with the input monitor 202 to detect inadvertent entry of passwords into non-password input fields. In an example, various types of password managers are known in the art that allow a user of a device to securely store and readily access passwords for various user accounts. In an example, a user is able to use a password manager 220 to retrieve a password for a particular account, and then copy that password from the password manager 220 into the clipboard 222. In such an example, the user generally intends to paste that password into the password field 254. However, the user may inadvertently paste the password in the clipboard 222 into another input field 252. In an example, the password manager 220 is able to be modified to operate with the input monitor 202 to identify an inadvertent pasting of a password into a non-password field. In a further example, the password manager 220 operates with the clipboard to prevent pasting from the clipboard into a non-password input field. In yet further examples, the password manager is able to mark fields as "sensitive" to cause the clipboard to prevent pasting of the clipboard contents.

The password manager 220 in various examples is any program that is used to store user passwords or other credentials. In some examples, password manager 220 allows a user to create or enter, and then securely stores, one or more password. A user is able to access those stored passwords by any suitable technique, which may include entering a master password. Once the user accesses the stored passwords, the user is able to copy a password into a clipboard 222. In various examples, the clipboard 222 is able to be a clipboard maintained by the operating system or other application. In one example, the clipboard 222 is able to be a special clipboard function maintained and controlled by the password manager 220.

In some examples that include a Bloom filter to determine whether a likely password has been entered into a non-password field, an initialization process for the Bloom filter is provided. In an example, the password manager 220 provides the password token determination processing component 204 with some or all of the passwords stored by the password manager 220. In some examples, the Bloom filter state 212 is initiated by storing values indicating all of the passwords that are stored by the password manager 220. In some examples, such initialization initially determines a totally number of passwords stored by the password manager 220 in order to more effectively determine parameters to be used by the Bloom Filter. For example, the number of passwords stored in the password manager 220, and the characteristics of those passwords such as size and other characteristics, supports more effective determination of, for example the size (e.g., number of bits) of the Bloom filter vector. The number of passwords and their complexity also allows more effective selection of the complexity and number of hash values to determine for each password, the number of bits to set in the Bloom filter vector for each password, other Bloom filter parameters, or combinations of these. Such an initialization allows the input monitor to immediately recognize a likely password without building up the Bloom filter state by actual entry of the passwords by a user into password fields of the device.

Figure 3:
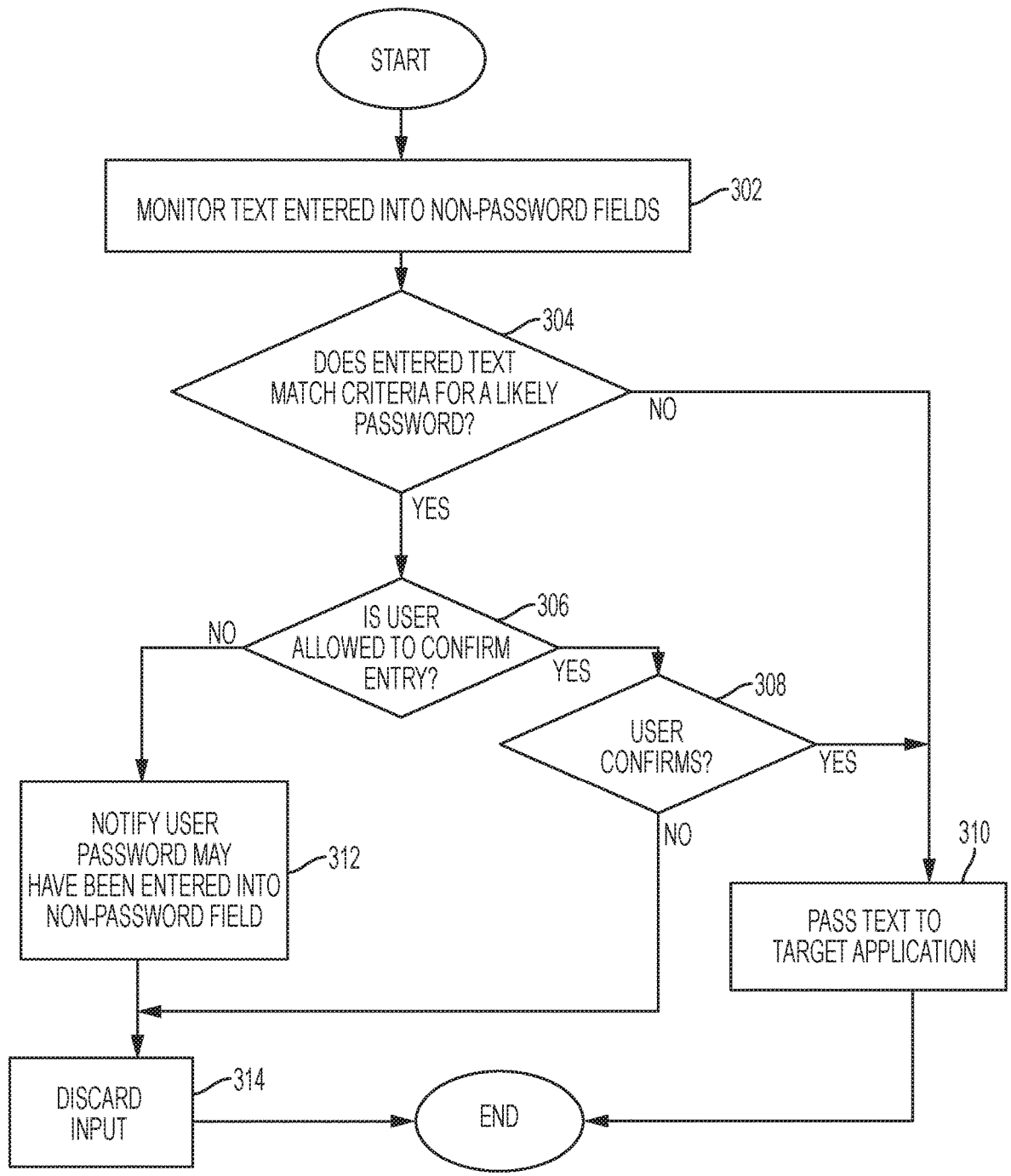
FIG. 3 illustrates an inadvertent password entry detection process, according to an example.

FIG. 3 illustrates an inadvertent password entry detection process 300, according to an example. The inadvertent password entry detection process 300 depicts a general process of identifying and responding to a likely inadvertent entry of a password into a non-password field.

The inadvertent password entry detection process 300 begins by monitoring, at 302, text entered into a non-password field. In an example, such monitoring is performed by the input monitor 202 discussed above. In various electronic devices, text entered into non-pas sword fields is able to be monitored via operating in conjunction with any suitable input methods, such as monitoring text input functions.

A determination is made, at 304, as to whether the entered text meets one or more criteria for being a likely password. As discussed above, in various examples, such criteria are able to include, without limitation, the entered text matching password rules definition 208, meeting one or more criteria based on an analysis by a Bloom Filter, hash values, or both, based upon indications from a password manager that clipboard contents were inadvertently pasted into a non-password input field, other criteria, or combinations of these. If this determination does not indicate that the entered dataset is likely a password, the text is passed to the target application, at 310 and the inadvertent password entry detection process 300 ends.

Returning to the determination, at 304, if it is determined that the entered text is likely a password, various operations to inhibit further processing of that dataset are able to be performed. In some examples, a display of the likely password in the non-password field is replaced with other characters (such as asterisks), is blurred or otherwise obscured. As is described below, one operation to inhibit further processing include prompting the user for confirmation to continue with the input of the entered text. Other operations include deleting the entered text from the non-password field or otherwise inhibiting further processing of the entered text, obscuring the display of the entered text contained in the non-password field, other processing or actions, or combinations of these.

Returning to the determination, at 304, if it is determined that the entered text is likely a password, a determination is made, at 306, as to whether the user is allowed to confirm the entry of a likely password into the non-password field. This determination is able in an example to be based on a configuration of the device. Allowing the user to confirm that the text should be accepted allows a more graceful and less obtrusive handling of an incorrectly identified likely password.

If the user is allowed to confirm the entry, a determination is made, at 308, as to whether the user confirms that the text should be accepted. Such a determination is able to be made in an example based upon a user's response to a prompt asking for such confirmation. In some examples, user confirmations include an ability for the user's selection to be applied to later prompts. For example, a user may be presented with a selection of options comprising "always accept," "accept once," "discard once," and "always discard" upon detection of a likely password into a non-password field. A user's selection of "always accept" or "always discard" is then able to be applied in future determinations, at 308, of a user's confirmation. In another example, the user is able to specify that a selection of "accept" or "deny" is to be provided in this decision for a determined time period, such as N minutes.

Returning to the confirmation, at 308, regarding the user's confirmation, if the user does not confirm that the text should be accepted, the input is discarded, at 314 and the inadvertent password entry detection process 300 ends. If the user confirms that the text should be accepted, the text is passed to the target application, at 310, and the inadvertent password entry detection process 300 ends.

Returning to determining, at 306, as to whether the user should be asked for confirmation, if it is determined that the user is not to be asked for confirmation, the user is notified, at 312, that a password may have been entered into a non-password field. The input is then discarded, at 314. Discarding of the input, at 314, in various examples is able to include any type of processing to protect the entered text. In an example, the entered text is removed from the non-password field into which it was entered. In some examples, processing prohibits the entered text from being passed to the target application by any suitable technique. In some examples, a display of the likely password in the non-password field is replaced with other characters (such as asterisks), is blurred or otherwise obscured. The inadvertent password entry detection process 300 ends.

Figure 4:
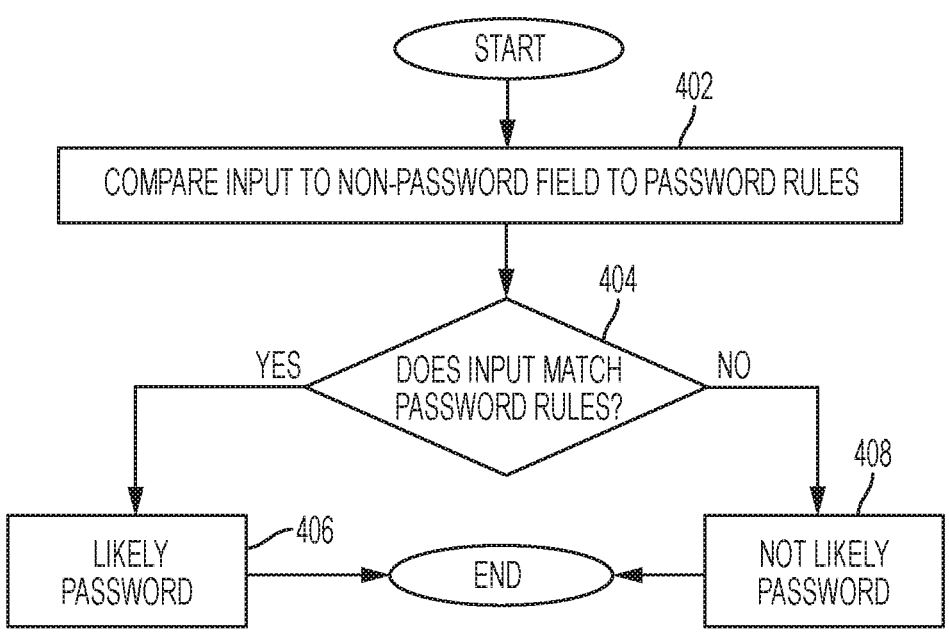
FIG. 4 illustrates a password rules comparison process, according to an example.

FIG. 4 illustrates a password rules comparison process 400, according to an example. The password rules comparison process 400 is an example of processing described above for the inadvertent password entry detection process 300 that is performed as part of the determination, at 304, as to whether entered text meets one or more criteria for being a likely password. The password rules comparison process 400 in an example is performed as part of the input monitor 202 based upon password rules defined in the password rules definition 208 as are described above.

The password rules comparison process 400 compares, at 402, input from non-password fields to the password rules. As described above, such password rules are able to specify criteria such as passwords require at least one capital letter, at least one numeral, and have at least a specified minimum number of characters. The input in an example is received as part of the monitor text entered into non-password fields 302, as is described above.

A determination is made, at 404, as to whether the input matches password rules. If the input does match the rules, the input is declared, at 406, to be a likely password. As such, the determination, at 304, as to whether the input meets one or more criteria for a likely password is true. If the input does not match the rules, the input is declared, at 408, to not be a likely password. As such, the determination, at 304, as to whether the input matches criteria for a likely password is false. The password rules comparison process 400 then ends.

Figure 5:
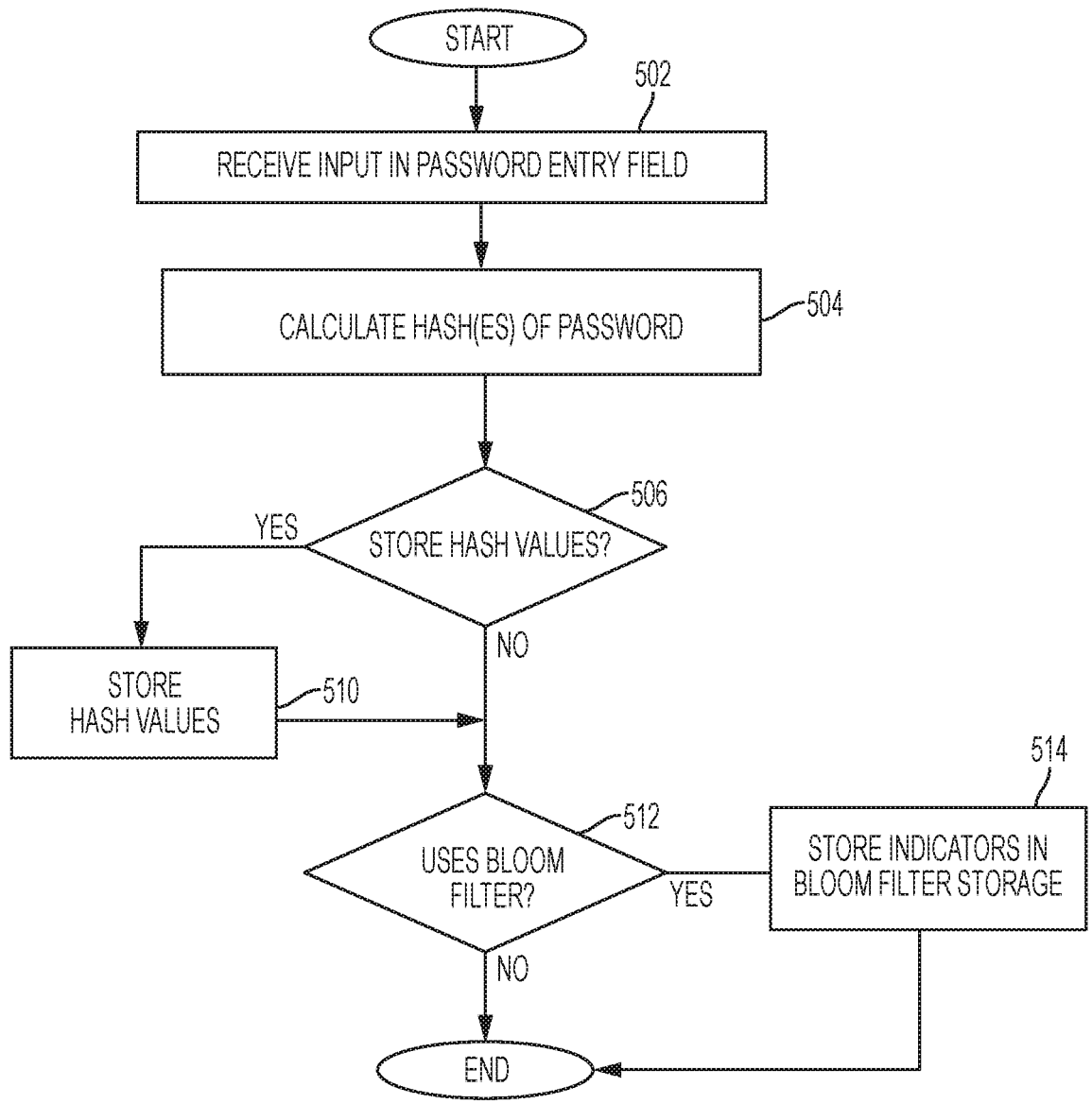
FIG. 5 illustrates a password token determination process, according to an example.

FIG. 5 illustrates a password token determination process 500, according to an example. The password token determination process 500 is an example of a process performed by the password token determination processing component 204, described above. In various examples, the password token determination process 500 operates to determine one or more hash values of data entered into password entry fields, maintains a Bloom filter vector to support identification of a likelihood that a text entry corresponds to text entered into a password entry field, determines other tokens, or combinations of these.

The password token determination process 500 receives, at 502, input in a password entry field. In various examples, such input is obtained by modification of password entry processing to provide such input to the password token determination process 500.

At least one or more hash values are determined, at 504. In various examples, multiple hash values are able to be determined for a particular input dataset to support various processing. As is described above, in some examples Bloom filters are able to store data based upon calculating a number of different hash values for an input dataset.

A determination is made, at 506, as to whether hash values are to be stored for the text datasets entered into a password entry field. If hash values are to be stored, they are stored, at 510. A determination is made, at 512, as to whether a Bloom filter is to be maintained for the datasets entered into password entry fields. The determination as to whether a Bloom filter is to be maintained is able to be based on any criteria, such as a configuration of the device to use a Bloom filter in determining if a likely password has been entered into a non-password field, any other criteria, or combinations of these. If a Bloom filter is to be maintained, indicators for the Bloom filter are stored, at 514, in a Bloom filter vector, such as is maintained in the above described Bloom filter state 212. The password token determination process 500 then ends.

Figure 6:
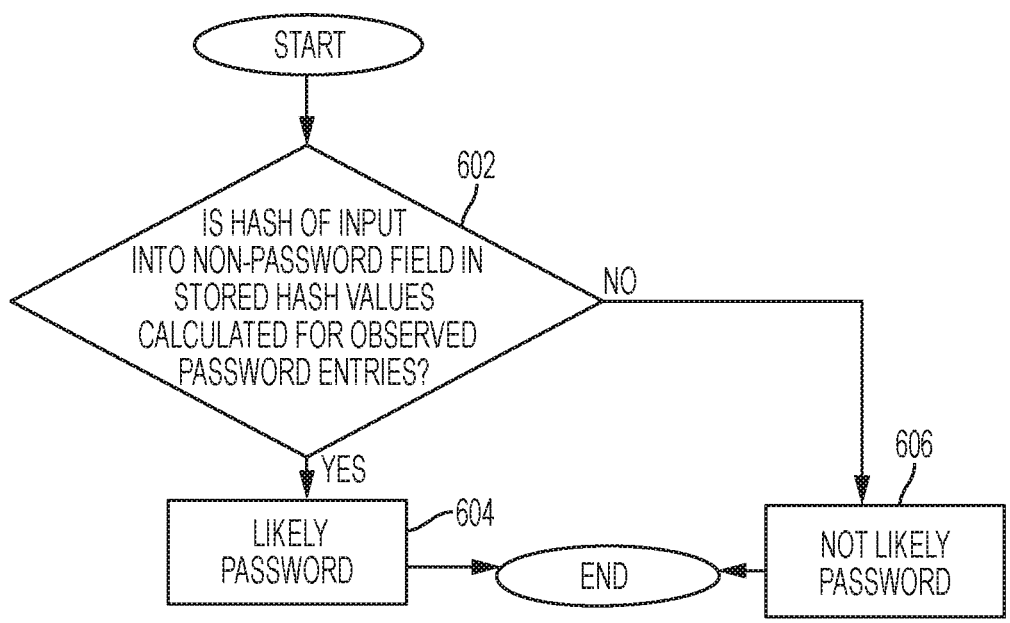
FIG. 6 illustrates a hash value comparison process, according to an example.

FIG. 6 illustrates a hash value comparison process 600, according to an example. The hash value comparison process 600 is an example of processing described above for the inadvertent password entry detection process 300 that is performed as part of the determination, at 304, as to whether entered text meets one or more criteria for being a likely password. The hash value comparison process 600 in an example is performed as part of the input monitor 202 based upon hash values stored in the password token storage 206 and determined by the password token determination process 500 as are described above.

In various examples, the hash value comparison process 600 is able to operate with any one or more types of hashes or similar values that correspond to a particular dataset. In addition to hash values, the hash value comparison process 600 is also able to operate with salted hashes, message authentication codes, other identifying values, or any combination of these.

A determination is made, at 602, as to whether a hash value of the input into a non-password field is in stored hash values calculated for the datasets that were entered into password entry fields. This determination in an example is made based upon calculating the hash value of each dataset input into non-password input fields using the same particular hash function as is used by the password token determination process 500, described above. The stored hash values calculated for the datasets that were entered into password entry fields are stored in an example in the hash value storage 210, described above. If the hash value for the input to the non-password field is stored in the hash value storage 210 in the above example, the input is declared, at 604, to be a likely password. As such, the determination, at 304, as to whether the input meets one or more criteria for a likely password is true. If the hash value for the input to the non-password field is not stored in the hash value storage 210 in the above example, the input is declared, at 606, to not be a likely password. As such, the determination, at 304, as to whether the input meets one or more criteria for a likely password is false. The hash value comparison process 600 then ends.

Figure 7:
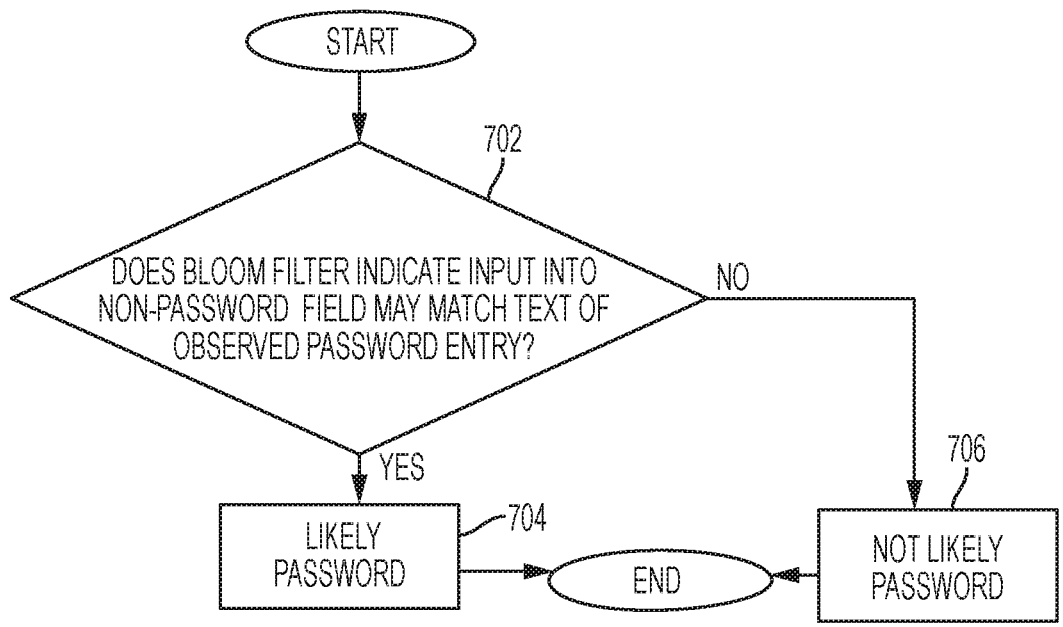
FIG. 7 illustrates a Bloom filter identification process, according to an example.

FIG. 7 illustrates a Bloom filter identification process 700, according to an example. The Bloom filter identification process 700 is an example of processing described above for the inadvertent password entry detection process 300 that is performed as part of the determination, at 304, as to whether entered text meets one or more criteria for being a likely password. The Bloom filter identification process 700 in an example is performed as part of the input monitor 202 based upon the Bloom Filter state 212 stored in the password token storage 206 and determined by the password token determination process 500 as are described above.

Figure 8:
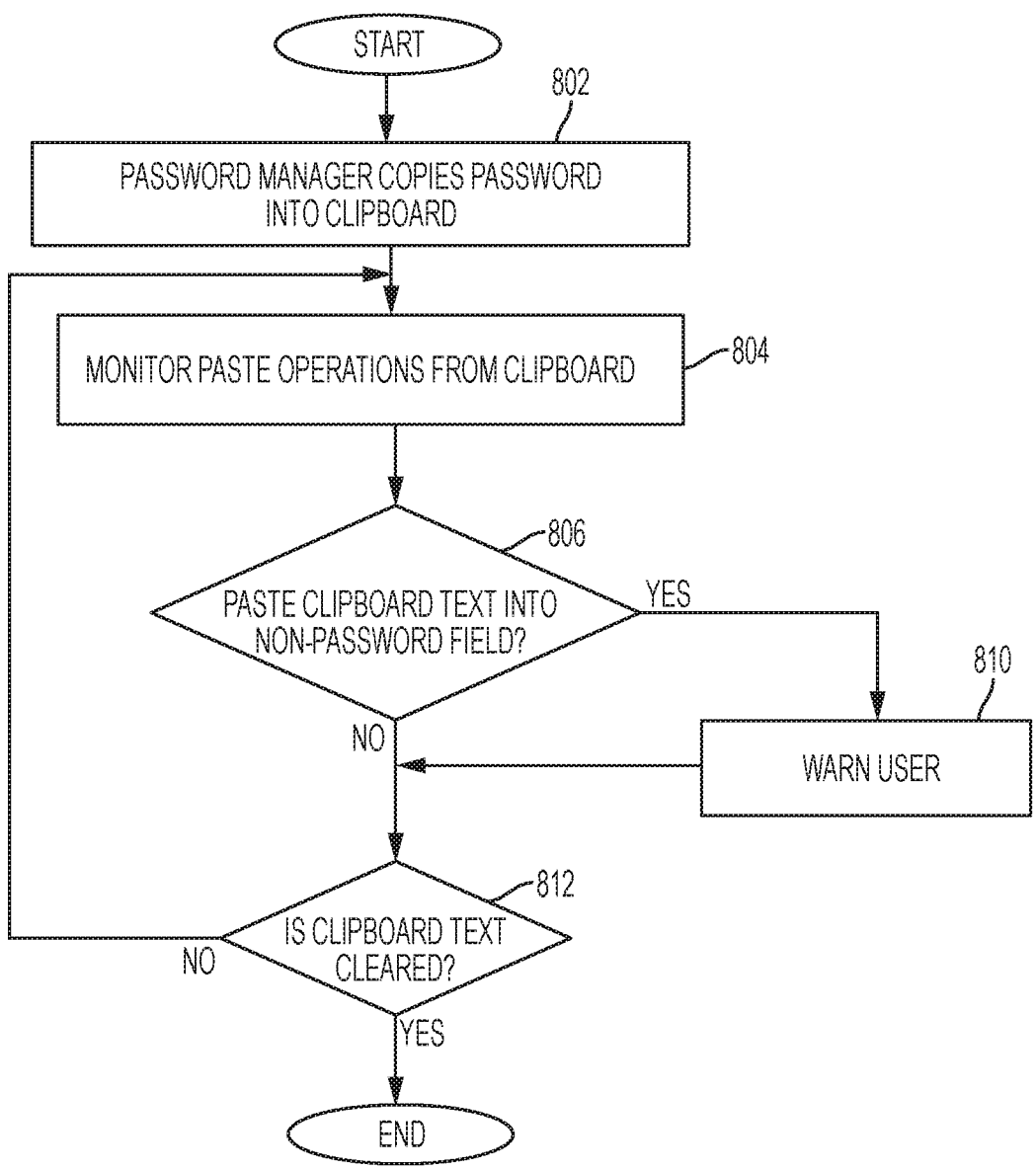
FIG. 8 illustrates a password manager input field monitoring process, according to an example.

A determination is made, at 702, as to whether the values in the Bloom filter indicate input into a non-password field may match text that was entered into a password field or that was otherwise inserted into the bloom filter. In an example, processing may prepare a Bloom filter for operation by adding values to the Bloom filter vector that correspond to the passwords stored by the password manager 220. This determination in an example is made based upon Bloom filter processing as is discussed above. If this determination is true, the input is declared, at 704, to be a likely password. As such, the determination, at 304, as to whether the input meets one or more criteria for a likely password is true. If this determination is not true, the input is declared, at 706, to not be a likely password. As such, the determination, at 304, as to whether the input meets one or more criteria for a likely password is false. The Bloom filter identification process 700 then ends FIG. 8 illustrates a password manager input field monitoring process 800, according to an example. The password manager input field monitoring process 800 describes interactions between the above described password manager 220 and input monitor 202 to determine whether a password copied into the clipboard 222 was pasted into a non-password entry field.

The password manager input field monitoring process 800 begins by the password manager 220 copying, at 802, a password into the clipboard 222. Such copying is an example of putting the password into the clipboard. In various examples, any suitable operation is able to be used to put a password into the clipboard as an alternative to the described example of copying. Such copying in an example occurs under a user's direction by the user copying into the clipboard 222 a selected password that is stored in the password manager 220. In an example, the password manager input field monitoring process 800 operates by continuing to monitor paste operations from the clipboard 222 until the contents of the clipboard 222 is cleared, and thus the password has been removed from the clipboard.

The password manager 220 in an example monitors, at 804, paste operations from the clipboard. Such monitoring is able to be made via interaction with user interface functions of a device that monitor data that is input into entry fields and identify the source of such data. When data is entered into a non-password input field, a determination is made, at 806, as to whether the clipboard text was pasted into a non-password field. In some examples, such an explicit determination is not needed because the monitoring of inputs is limited to monitoring system functions that are not performed when entering text into a password entry field. In some examples, the password manager 220 operates to prevent the pasting into a non-password field any password that was copied into the clipboard. In some examples, the password manager 220 monitors for any clipboard reading operations, such as non-foreground applications that attempt to read the contents of the clipboard 222.

If it is determined that the contents of the clipboard 222 is entered into, or attempted to be entered into, a non-password field, the user is warned, at 810. Such a warning may prohibit the pasting of the contents of the clipboard 222, may prompt for confirmation, may include other processing, or combinations of these. The prompt may further offer a selection to clear the contents of the clipboard. Such a prompt may further include various options such as "always accept," "accept once," "deny once," "deny always," "accept for a specified time duration", "accept for a specified number of attempts," "deny for a specified time duration," "deny for a specified number of attempts," other options, or combinations of these.

If it is determined that the contents of the clipboard 222 were not pasted into a non-password field, or after the user is warned, a determination is made, at 812, as to whether the text in the clipboard 222 is cleared. The text of the clipboard is able to be cleared by a number of operations, such as a user pasting other data into the clipboard 222. In one example, the password manager is able to automatically clear the clipboard contents when the clipboard contains a password that is pasted into any field or into a particularly type of field. ns of these. The prompt may further offer a selection to clear the contents of the clipboard. Such a prompt may further include various options such as "always accept," "accept once," "deny once," "deny always," "accept for a specified time duration", "accept for a specified number of attempts," "deny for a specified time duration," "deny for a specified number of attempts," other options, or combinations of these. If the text in the clipboard is not cleared, the password manager input field monitoring process 800 returns to monitoring, at 804, paste operations from the clipboard. If text in the clipboard 222 is cleared, the password manager input field monitoring process 800 ends.

Figure 9:
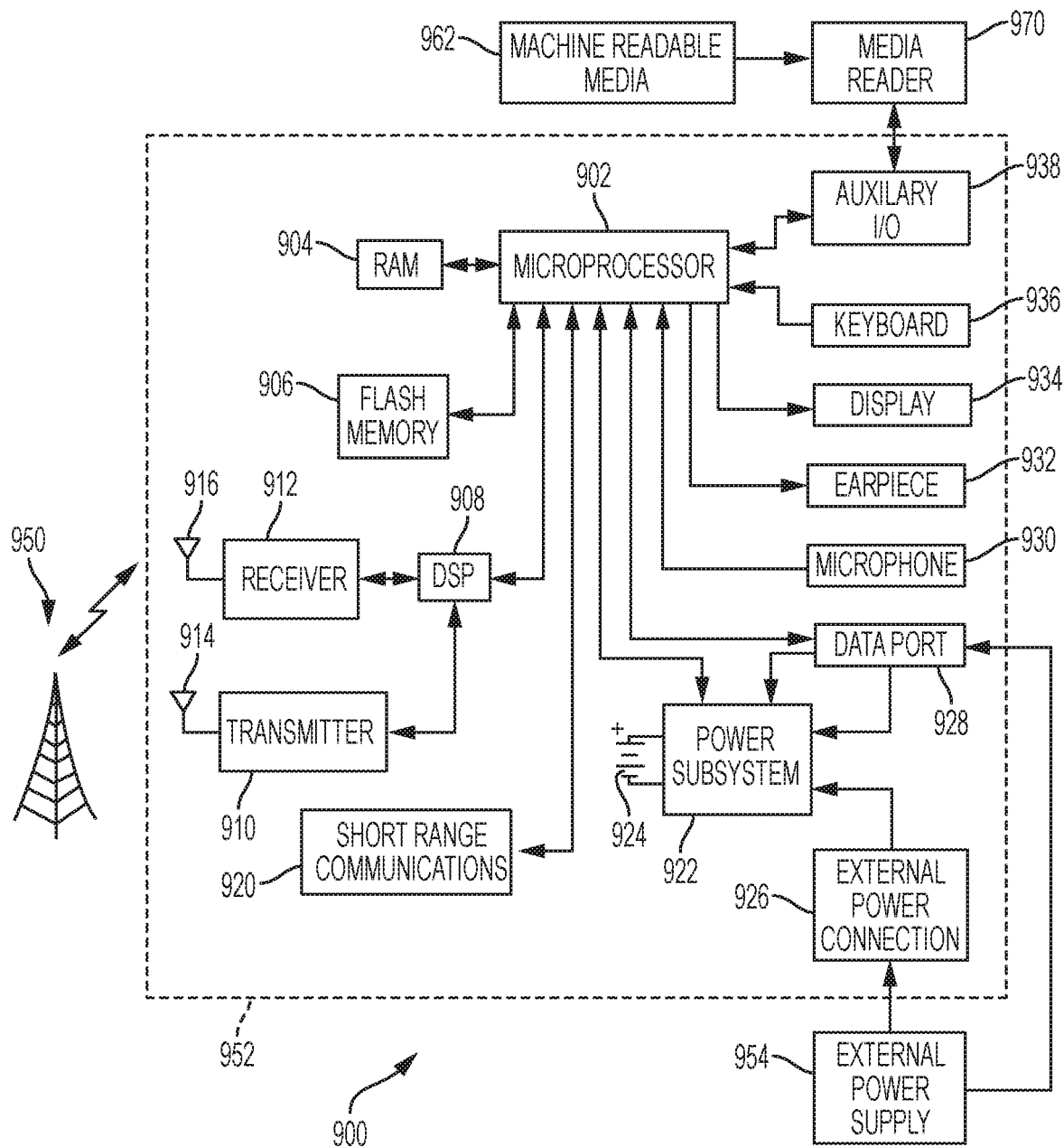
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. The electronic device 952 in this example is a wireless two-way communication device with one or more of the following: voice, text, and data communication capabilities. Such electronic devices communicate with a wireless voice, text, or data network 950 using a suitable wireless communications protocol. Wireless voice communications may be performed using either an analog or digital wireless communication channel. Data communications allow the electronic device 952 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 952 is an example electronic device that includes two-way wireless communications functions. Such electronic devices may incorporate communication system elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication system may be dependent upon the communication network and associated wireless communications protocols with which the device is intended to operate.

The electronic device 952 includes a microprocessor 902 that controls the overall operation of the electronic device 952. The microprocessor 902 interacts with the above described communications system elements and also interacts with other device systems. In various examples, the electronic device 952 is able to include one or more of various components such as a flash memory 906, random access memory (RAM) 904, auxiliary input/output (I/O) device 938, data port 928, display 934, keyboard 936, earpiece 932, audio sound reproduction system 970, microphone 930, a short-range communications system 920, a power system 922, other systems, or combinations of these.

One or more power storage or supply elements, such as a battery 924, are connected to a power system 922 to provide power to the circuits of the electronic device 952. The power system 922 includes power distribution circuitry for providing power to the electronic device 952 and also contains battery charging circuitry to manage recharging the battery 924 (or circuitry to replenish power to another power storage element). The power system 922 receives electrical power from external power supply 954. The power system 922 is able to be connected to the external power supply 954 through a dedicated external power connector (not shown) or through power connections within the data port 928. The power system 922 includes a battery monitoring circuit that is operable to provide a status of one or more battery status indicators, such as remaining capacity, temperature, voltage, electrical current consumption, and the like, to various components of the electronic device 952.

The data port 928 is able to support data communications between the electronic device 952 and other devices through various modes of data communications, such as high speed data transfers over an optical communications circuits. Data port 928 is able to support communications with, for example, an external computer or other device. In some examples, the data port 928 is able to include electrical power connections to provide externally provided electrical power to the electronic device 952, deliver electrical power from the electronic device 952 to other externally connected devices, or both. Data port 928 of, for example, an electronic accessory is able to provide power to an electronic circuit, such as microprocessor 902, and support exchanging data between the microprocessor 902 and a remote electronic device that is connected through the data port 928.

Data communication through data port 928 enables a user to set preferences through the external device or through a software application and extends the capabilities of the device by enabling information or software exchange through direct connections between the electronic device 952 and external data sources rather than via a wireless data communication network. In addition to data communication, the data port 928 provides power to the power system 922 to charge the battery 924 or to supply power to the electronic circuits, such as microprocessor 902, of the electronic device 952.

Operating system software used by the microprocessor 902 is stored in flash memory 906. Examples of flash memory 906 are able to include, for example, flash memory, magnetic based storage devices, other volatile or non-volatile data store elements, or the like. Some examples are able to use flash memory 906 that includes a battery backed-up RAM or other non-volatile storage data elements to store operating systems, other executable programs, or both. The operating system software, device application software, or parts thereof, are able to be temporarily loaded into volatile data storage such as RAM 904. Data received via wireless communication signals or through wired communications are also able to be stored to RAM 904. The microprocessor 902 in some examples are able to execute program components, such as is able to be defined in flash memory 906 in one example, that cause the microprocessor 902 to perform the above described processes and methods.

The microprocessor 902, in addition to its operating system functions, is able to execute software applications on the electronic device 952. A set of applications that control basic device operations, including at least data and optionally voice communication applications, is able to be installed on the electronic device 952 during manufacture. In an example, programs and other data used to support the processes described above are able to be installed in the memory of the electronic device 952. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 952 through, for example, the wireless network 950, an auxiliary I/O device 938, Data port 928, short-range communications system 920, or any combination of these interfaces. Such applications are then able to be installed by a user in the RAM 904 or a non-volatile store for execution by the microprocessor 902.

In a data communication mode, a received signal such as a text message or web page download is processed by the communication system, including wireless receiver 912 and wireless transmitter 910, and communicated data is provided the microprocessor 902, which is able to further process the received data. In some examples, the electronic device 952 includes a display, output ports, or combinations of these. In such examples, the received data is able to be processed for output to the display 934, or alternatively, to an auxiliary I/O device 938 or the Data port 928. In examples of the electronic device 952 that include a keyboard 936 or other similar input facilities, a user of the electronic device 952 may also compose data items, such as e-mail messages, using the keyboard 936, which is able to include a complete alphanumeric keyboard or a telephone-type keypad, in conjunction with the display 934 and possibly an auxiliary I/O device 938. Such composed items are then able to be transmitted over a communication network through the communication system.

For voice communications, overall operation of the electronic device 952 is similar, except that received signals are generally provided to an earpiece 932 and signals for transmission are generally produced by a microphone 930. Alternative voice or audio I/O systems, such as a voice message recording system, may also be implemented on the electronic device 952. Although voice or audio signal output is generally accomplished primarily through the earpiece 932, in examples of electronic devices 952 that include a display 934, the display 934 may also be used to provide an indication of the identity of a calling party, the duration of a voice call, or other voice call related information, for example.

Depending on conditions or statuses of the electronic device 952, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 920 provides for data communication between the electronic device 952 and different systems or devices, which need not necessarily be similar devices. For example, the short-range communications system 920 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these.

A media reader 960 is able to be connected to an auxiliary I/O device 938 to allow, for example, loading computer readable program code of a computer program product into the electronic device 952 for storage into flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. Media reader 960 is alternatively able to be connected to the electronic device through the Data port 928 or computer readable program code is alternatively able to be provided to the electronic device 952 through the wireless network 950.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
receiving, via a user interface, a command to paste a password from a password manager into a clipboard;
receiving, via the user interface, a command to paste the password from the clipboard into a non-password field as a dataset;
storing, by a password manager, at least one password;
allowing, by the password manager, user access to the at least one password;
monitoring, by a password manager program, pasting into and from the clipboard;
determining, by the password manager program, based on the monitoring of pasting into and from the clipboard, that:
the password is pasted from the password manager into the clipboard, and
that the password is pasted from the clipboard into a non-password field;
automatically inhibiting, based on determining that the password is pasted from the password manager into the clipboard and that the password is pasted from the clipboard into a non-password field, further processing of the password;
automatically clearing the clipboard based on the determining that the password is pasted from the clipboard into the non-password field; and
monitoring, until contents of the clipboard are cleared, to support the determining that the password is pasted from the password manager to the clipboard and that the password is pasted from the clipboard into a non-password field.

2. The method of claim 1, further comprising:
determining, based on the dataset meeting one or more criteria for a likely password, that the dataset is inadvertently entered into the non-password field, where the one or more criteria comprises password complexity rules, and
wherein the automatically inhibiting is further based on determining that the dataset is inadvertently into the non-password field.

3. The method of claim 1, further comprising:
monitoring entry of entered passwords into a password entry field, the password entry field being different from the non-password field;
determining at least one password token based on the entered passwords; and
determining at least one dataset token based on the dataset,
wherein the automatically inhibiting is further based on determining that any of the at least one dataset token matches any of the at least one password token.

4. The method of claim 3, wherein the at least one password token and the at least one dataset token comprises a respective hash value calculated by a particular hash function.

5. The method of claim 3, wherein the at least one password token and the at least one dataset token comprises data bits set in a Bloom filter vector, and
wherein the determining that any of the at least one dataset token matches any of the at least one password token comprises a determination of a likely match according to Bloom filter processing.

6. An input data processor, comprising:
a processor;
a memory, communicatively coupled to the processor;
an input monitor, executed by the processor, that:
receives, via a user interface, a command to paste a password from a password manager into a clipboard;
receives, via the user interface, a command to paste the password from the clipboard into a non-password field as a dataset; and
a password monitor, executed by the processor, that:
stores at least one password; and
allows user access to the at least one password;
a password monitor program, executed by the processor, that:
monitors pasting of the clipboard;
determines, based on monitoring pasting of the clipboard, that the password is pasted from the password manager into the clipboard and that the password is pasted from the clipboard into a non-password field;
automatically inhibits, based on a determination that the password is pasted from the password manager into the clipboard and that the password is pasted from the clipboard into a non-password field, further processing of the password;
automatically clears the clipboard based on a determination that the password is pasted from the clipboard into the non-password field; and
monitors, until contents of the clipboard are cleared, to support the determining that the password is pasted from the password manager to the clipboard and that the password is pasted from the clipboard into a non-password field.

7. The input data processor of claim 6, wherein the input monitor further:
determines, based on the dataset meeting one or more criteria for a likely password, that the dataset is inadvertently entered into the non-password field, where the one or more criteria comprises password complexity rules, and
further bases automatically inhibiting further processing of the password on a determination that the dataset is inadvertently into the non-password field.

8. The input data processor of claim 6, further comprising a password token determination process configured to:
monitor entry of entered passwords into a password entry field, the password entry field being different from the non-password field; and
determine at least one password token based on the entered passwords,
wherein the input monitor further:
determines at least one dataset token based on the dataset, and
further bases automatically inhibiting further processing of the password on a determination that any of the at least one dataset token matches any of the at least one password token.

9. The input data processor of claim 8, wherein the at least one password token and the at least one dataset token comprises a respective hash value calculated by a particular hash function.

10. The input data processor of claim 8, wherein the at least one password token and the at least one dataset token comprises data bits set in a Bloom filter vector, and wherein a determination that any of the at least one dataset token matches any of the at least one password token a determination of a likely match according to Bloom filter processing.

11. The input data processor of claim 8, wherein the password manager monitors continually, to support a determination that the password is pasted from the password manager to the clipboard and that the password is pasted from the clipboard into a non-password field, until contents of the clipboard are cleared.

12. A non-transitory computer readable storage device having computer readable program code embodied therewith, the computer readable program code comprising instructions that, when executed:
receive, via a user interface, a command to paste a password from a password manager into a clipboard;
receive, via the user interface, a command to paste the password from the clipboard into a non-password field as a dataset;
store, by a password manager, at least one password;
allow by the password manager, user access to the at least one password;
monitor, by a password manager program, pasting to and from the clipboard;
determine, by the password manager program, based on the monitoring of pasting from and into the clipboard, that:
the password is pasted from the password manager into the clipboard, and
that the password is pasted from the clipboard into a non-password field;
automatically inhibit, based on determining that the password is pasted from the password manager into the clipboard and that the password is pasted from the clipboard into a non-password field, further processing of the password; and
automatically clear the clipboard based on the determining that the password is pasted from the clipboard into the non-password field; and
monitor, until contents of the clipboard are cleared, to support the determining that the password is pasted from the password manager to the clipboard and that the password is pasted from the clipboard into a non-password field.

13. The non-transitory computer readable storage device of claim 12, the computer readable program code further comprising instructions for:
determining, based on the dataset meeting one or more criteria for a likely password, that the dataset is inadvertently entered into the non-password field, where the one or more criteria comprises password complexity rules, and
wherein the automatically inhibiting is further based on determining that the dataset is inadvertently into the non-password field.

14. The non-transitory computer readable storage device of claim 12, the computer readable program code further comprising instructions for:
monitoring entry of entered passwords into a password entry field, the password entry field being different from the non-password field;
determining at least one password token based on the entered passwords; and
determining at least one dataset token based on the dataset, wherein the automatically inhibiting is further based on determining that any of the at least one dataset token matches any of the at least one password token.

15. The non-transitory computer readable storage device of claim 14, wherein the at least one password token and the at least one dataset token comprises data bits set in a Bloom filter vector, and
   wherein the determining that any of the at least one dataset token matches any of the at least one password token comprises a determination of a likely match according to Bloom filter processing.

16. The method of claim 1, further comprising displaying, based on receiving the command to paste the password from the clipboard into the non-password field, an altered version of the password in the non-password field, wherein the altered version of the password comprises at least one of:
   a blurred version of the password;
   a masked version of the password; or
   an obscured version of the password.

17. The method of claim 1, further comprising:
   determining, based on receiving the command to paste the password from the password manager to the clipboard, that the password satisfies password rules
   calculating, based on determining that the password satisfies password rules, a hash value for the password;
   storing the hash value into a hash value storage;
   comparing the hash value to previously calculated hash values previously stored in the stored hash values;
   determining, based on the comparing the hash value, that the hash value corresponds to a hash value in the hash value storage; and
   wherein the automatically inhibiting is further based on determining that the hash value corresponds to a hash value in the hash value storage.

\* \* \* \* \*